Aug. 11, 1942.   L. WESCH   2,292,555
METHOD OF MAKING LUMINESCENT MATERIALS
Filed March 20, 1940
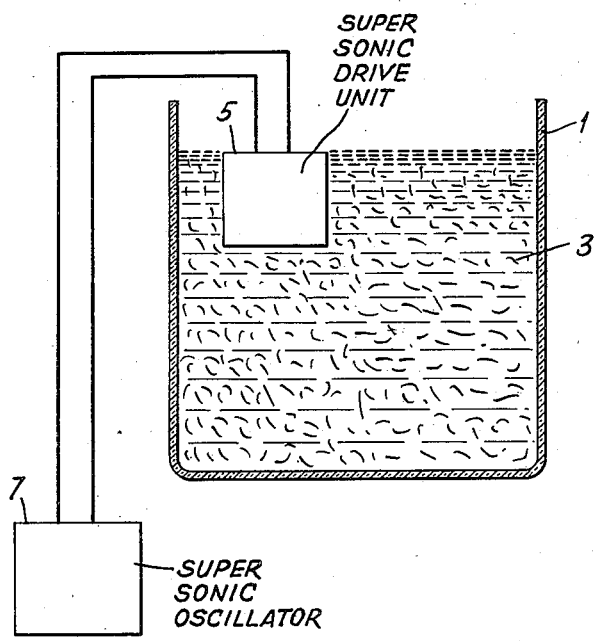
INVENTOR
LUDWIG WESCH
BY
ATTORNEY Patented Aug. 11, 1942

2,292,555

UNITED STATES PATENT OFFICE 2,292,555

METHOD OF MAKING LUMINESCENT MATERIALS

Ludwig Wesch, Heidelberg, Germany, assignor to Telefunken Gesellschaft für Drahtlose Telegraphie m. b. H., Berlin, Germany, a corporation of Germany Application March 20, 1940, Serial No. 325,063
In Germany March 31, 1938

4 Claims. (Cl. 250—81)

This invention relates to a new and improved method for making luminescent materials, and in particular, is related to a method of preparing luminescent materials in which substantially all the luminescent material is active and free from "dead"' or inert filler material.

In the manufacture of luminescent materials, commonly known as "phosphors," which are used in connection with electronic irradiation systems as known to the prior art, much of the material after being comminuted is inactive to convert the impacting electronic energy into light radiation. This apparently results from the fact that during the course of manufacture, the fine particles of luminescent material are coated with a layer of stressed crystalline structure, and this layer apparently prevents the excitation of the active centers of the material. In addition, it is possible that the small amount of activator, which is present in a very small percentage, is not thoroughly dispersed throughout the material, and accordingly, much of the base material, i. e. the bulk of the phosphor remains unactivated. To overcome this and to produce a more uniformly responsive luminescent material, my invention teaches the use of treating the material with ultra-sonic wave energy in order that a more thorough dispersion of the activating material may be brought about and at the same time to prevent the formation of such stressed surfaces which lower the efficiency of conversion of radiant energy into light energy.

Accordingly, one of the main objects of my invention is to provide a new method for preparing luminescent materials.

Another object of my invention is to process luminescent materials with ultra-sonic waves so as to provide a more efficient and uniform luminescent material.

Other objects of my invention will become apparent upon reading the following detailed explanation together with the drawing.

In the drawing I have shown schematically apparatus for carrying out the processing of my material.

Turning now to the drawing, I have shown a container 1 holding a suspension 3 of comminuted luminescent material which may be prepared in one of the fashions known to the prior art. A super-sonic driving unit 5 which may comprise, for example, a quartz crystal such as known in the prior art, feeds energy into the container, the unit being driven from a source of energy 7.

It has been found that by treating the material in the suspension of liquid with super-sonic waves, the destructive actions which have occurred in the course of grinding are corrected and that the slow disintegration of the activated centers is substantially overcome so that only very stable centers of activation which occur in the interstices of the lattice structure of the crystalline material remain.

A further advantage arising out of this supersonic treatment is a reduction of inertia. That is to say, the threshold value at which conversion of light takes place upon irradiation by radiant energy which, in addition to electronic energy, may be ultra-violet light or ionic discharge energy, is reduced.

Alternatively, the irradiation by ultra-sonic wave energy of the luminescent material may be provided during the processing or manufacturing of the material. Under these conditions, the activating metal is substantially completely dispersed and, in addition, a larger amount of activating metal may be incorporated into the base material than is possible in the methods of manufacturing known in the past. The incorporation of a larger amount of activating material results in an increase in intensity and efficiency of the resultant phosphors. Moreover, irradiation by ultra-sonic wave energy during the manufacture of the material prevents undue conglomeration of the base material molecules, so that very small activation centers are formed. This, as is well known in the prior art, reduces the threshold value or inertia of the obtained materials.

Having described my invention, what I claim is:

1. The method of providing finely divided efficient luminescent material which includes the steps of comminuting the luminescent material to fine particles having a deleterious stressed crystalline layer and subsequently irradiating the comminuted luminescent material with supersonic wave energy during the process of manufacture, whereby the effects of the deleterious stressed crystalline layer are corrected.

2. The method of providing finely divided efficient luminescent material which includes the steps of comminuting the luminescent material to fine particles having a deleterious stressed crystalline layer, forming a suspension of the comminuted luminescent material and irradiating the formed suspension with super-sonic wave energy, whereby the effects of the deleterious stressed crystalline layer are corrected.

3. The method of providing finely divided efficient luminescent material which comprises the steps of comminuting the luminescent material to fine particles having a deleterious stressed crystalline layer, forming a suspension of the comminuted luminescent material, irradiating the formed suspension with super-sonic wave energy, whereby the effects of the deleterious stressed crystalline layer are corrected, recovering the irradiated luminescent material from the suspension and subsequently drying the recovered material.

4. The method of improving the conversion efficiency of finely comminuted luminescent material having a deleterious stressed crystalline surface which includes the deleterious step of relieving the stressed layer of comminuted luminescent material of strains by subjecting the comminuted material to super-sonic wave energy irradiations, whereby the deleterious effects are corrected.

LUDWIG WESCH.